United States Patent [19]
Winkler

[11] Patent Number: 5,975,832
[45] Date of Patent: Nov. 2, 1999

[54] BALE HANDLING APPARATUS

[76] Inventor: Virgil L. Winkler, 14848 Kinderpost Rd., Licking, Mo. 65542

[21] Appl. No.: 09/170,249

[22] Filed: Oct. 13, 1998

[51] Int. Cl.$^6$ ....................................................... B60P 1/48
[52] U.S. Cl. ........................... 414/555; 212/247; 414/24.5; 414/695.6; 414/695.8
[58] Field of Search ........................... 212/247; 414/24.5, 414/555, 687, 739, 695.6, 695.8, 744.7

[56] References Cited

U.S. PATENT DOCUMENTS

| | | | |
|---|---|---|---|
| 3,760,956 | 9/1973 | Burch | 212/247 X |
| 3,800,966 | 4/1974 | Newton | 414/555 X |
| 4,091,943 | 5/1978 | Bay-Schmith | 414/555 X |
| 4,273,503 | 6/1981 | Damron | 414/687 X |
| 4,552,501 | 11/1985 | Clark et al. | 414/555 X |
| 4,573,845 | 3/1986 | Carpenter | 414/24.5 |
| 4,971,504 | 11/1990 | Klompien | 414/111 |
| 5,062,757 | 11/1991 | Eichenauer | 414/24.5 |
| 5,340,259 | 8/1994 | Flaskey | 414/24.5 |
| 5,603,597 | 2/1997 | Clay | 414/24.5 |
| 5,676,513 | 10/1997 | Bingham | 414/24.5 |

FOREIGN PATENT DOCUMENTS

644056  10/1950  United Kingdom ................... 414/687

*Primary Examiner*—Janice L. Krizek
*Attorney, Agent, or Firm*—Henderson & Sturm

[57] ABSTRACT

The large bale handling apparatus comprises a wheeled flat bed trailer, and a rotatable articulating arm with a bale lifting mechanism rotatably and pivotally attached thereto. The bale lifting mechanism may be a lifting fork attachment for lifting large round bales or a rectangular bale attachment for lifting large rectangular bales. The articulating arm includes a rotatable substantially vertical mast portion and a boom portion. Two hydraulic cylinders enable the boom to raise and lower as well as extend and retract. Therefore, because the articulating arm, with the bale lifting mechanism attached thereto, is rotatable 360 degrees about a vertical axis and can raise or lower and extend and retract, the arm can pick up all the large bales around the trailer within its reach and stack them onto the trailer. When unloading the bales from the trailer, the articulating arm can drop the bales directly into a feeding bunk or stack them on the ground for later use.

12 Claims, 7 Drawing Sheets

BALE HANDLING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to devices for the handling of hay bales and the like, and more particularly to a bale handling apparatus for use in loading, transporting, and unloading large round or rectangular hay bales.

2. Description of the Related Art

Large bale loading and transport devices have been utilized for many years. One common large bale handling device is a two or three-prong lifting fork that is attached to the back of a tractor's three-point hitch. In operation, the tractor is backed toward one end of the bale with the lifting fork in a lowered position. The fork points either spear the end of the bale, or straddle the bottom of the bale or both. The lifting fork is then raised by the three-point hitch thereby lifting the bale off the ground. The bale is then transported by the tractor to the desired location. The disadvantage of this type of bale handling device is that the tractor and lifting fork must be maneuvered to be substantially square with one end of the bale. If the lifting fork is not substantially square with the end of the bale, the forks will not penetrate or straddle the end of the bale, and the bale will simply spin on the ground, requiring the tractor to be remaneuvered and realigned with the end of the bale. This problem is of significantly more concern with large round hay bales, especially on hilly ground. Another disadvantage of this type of bale handling device is that only one bale can be transported at a time. Additionally, because this bale handling device is attached to a tractor's three point hitch, multiple bales cannot be loaded onto a conventional flatbed trailer because the forks will not raise high enough to place the bales onto the trailer.

To overcome this problem, the above described lifting fork has been adapted to attach to a tractor's front-end loader. The lifting fork either replaces the bucket of the loader or is adapted to mount on the loader bucket. Although mounting the lifting fork on a tractor's front-end loader enables the bales to be lifted high enough for loading the bales onto a trailer, it does not overcome the problem of having to maneuver the tractor and lifting fork to be substantially square with one end of the bale before the bale can be lifted.

Still another modification of this device is disclosed in U.S. Pat. No. 5,603,597 wherein the lifting fork has been adapted to mount to the bumper of a pickup truck. However this device suffers from the same disadvantages described above.

Other types of large bale handling devices, such as those disclosed in U.S. Pat. Nos. 4,573,845; 5,062,757; 5,340,259 and 5,676,513, have incorporated a lifting mechanism with a transporting trailer. Although these devices enable multiple bales to be loaded onto a trailer for transport, these devices pose similar problems to the above described devices in that the entire trailer on which the lifting mechanism is attached must be maneuvered and aligned with each bale before the bale can be lifted. It should be readily apparent that the aligning and maneuvering requirements of these devices with each bale to be lifted causes considerable waste of time and effort in loading the bales.

Accordingly, there is a need for a large bale handling apparatus which can be mountable on a trailer or other transport device that enables large bales to be loaded and stacked onto a trailer without requiring the entire trailer to be maneuvered and aligned with the bale.

In addition to the above identified disadvantages of the existing large bale handling devices, all of these devices pose similar problems when unloading the bales from the trailer. In order to unload the bales from the trailer, a second bale handling apparatus such as a tractor with a lifting fork must be used to move the bales away from the trailer once the bale is unloaded from the trailer. Alternatively, the trailer itself must be moved after each bale is unloaded.

Accordingly, there is a need for a large bale handling apparatus which can be mountable on a trailer or other transport device that enables a user to load and unload large bales without having to employ a second bale handling apparatus such as a tractor with a lifting fork or without having to move the trailer after each bale is unloaded. Additionally, there is a need for a large bale handling apparatus which can unload bales and place them directly into a feeding bunk or alternatively stack the bales for storage without employing a second bale handling apparatus such as a tractor with a lifting fork.

BRIEF SUMMARY OF THE INVENTION

A large bale handling apparatus that enables a user to pick up large round or rectangular bales for stacking onto a trailer. The apparatus also enables the bales to be unloaded from the trailer and placed directly into a feeding bunk or stacked for storage without requiring a second handling apparatus.

The large bale handling apparatus preferably comprises a wheeled flat bed trailer, and a rotatable articulating arm with a bale lifting mechanism rotatably and pivotally attached thereto. The bale lifting mechanism may be a lifting fork attachment for lifting large round bales or a rectangular bale attachment for lifting large rectangular bales. The articulating arm includes a rotatable substantially vertical mast portion and a boom portion. The mast portion is comprised of a stationary post secured to the trailer, a rotatable sleeve disposed over a portion thereof, and a means for rotating the sleeve with respect to the stationary post. The entire articulating arm is therefore able to sweep a 360 degree arc around the trailer. The boom portion is pivotally attached at one end to the sleeve and rotatably and pivotally supports a bale lifting mechanism at its other end. The boom portion preferably includes a first elongated beam pivotally connected to a second elongated beam at approximately the middle of the boom. A first hydraulic cylinder is pivotally attached to the sleeve and the first elongated beam. A second hydraulic cylinder is pivotally attached to the first elongated beam and to the second elongated beam. Thus, the two hydraulic cylinders enable the boom to raise and lower as well as extend and retract. Therefore, because the articulating arm, with the bale lifting mechanism attached thereto, is rotatable 360 degrees about a vertical axis and can raise or lower and extend and retract, the arm can pick up all the large bales around the trailer within its reach and stack them onto the trailer. When unloading the bales from the trailer, the articulating arm can drop the bales directly into a feeding bunk or stack them on the ground for later use without having to move the trailer after each bale is unloaded or having to employ a tractor with a lifting fork to move the bales out of the way from the unloading mechanism.

Therefore, an object of the present invention is the provision of an improved large bale handling apparatus.

Another object of the present invention is to provide a large bale handling apparatus for loading and transporting multiple large bales.

A further object of the present invention is to provide a large bale handling apparatus that can be used for lifting, stacking and transporting multiple large round or rectangular bales.

Yet another object of the present invention is to provide a large bale handling apparatus wherein the transport trailer does not have to be maneuvered and aligned in order to load and unload the bales.

Other objects, advantages, and novel features of the present invention will become apparent from the following detailed description of the invention when considered in conjunction with the accompanying drawings.

DETAILED DESCRIPTION OF THE INVENTION

Figure 1:
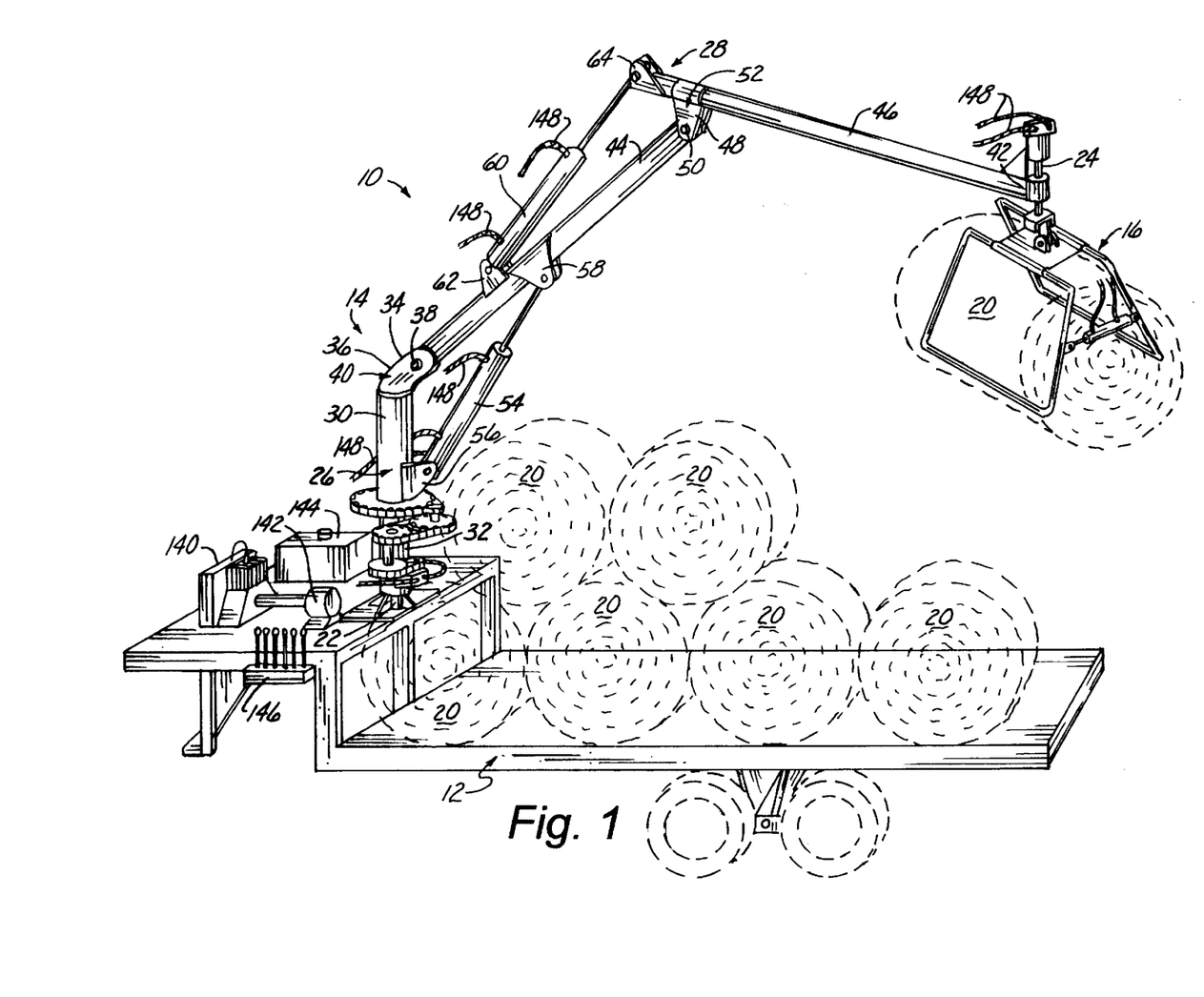
FIG. 1 is a perspective view of the large bale handling apparatus of the present invention.

Referring now to the drawings, wherein like reference numerals designate identical or corresponding parts throughout the several views, FIG. 1 shows the large bale handling apparatus (10) of the present invention.

Figure 2:
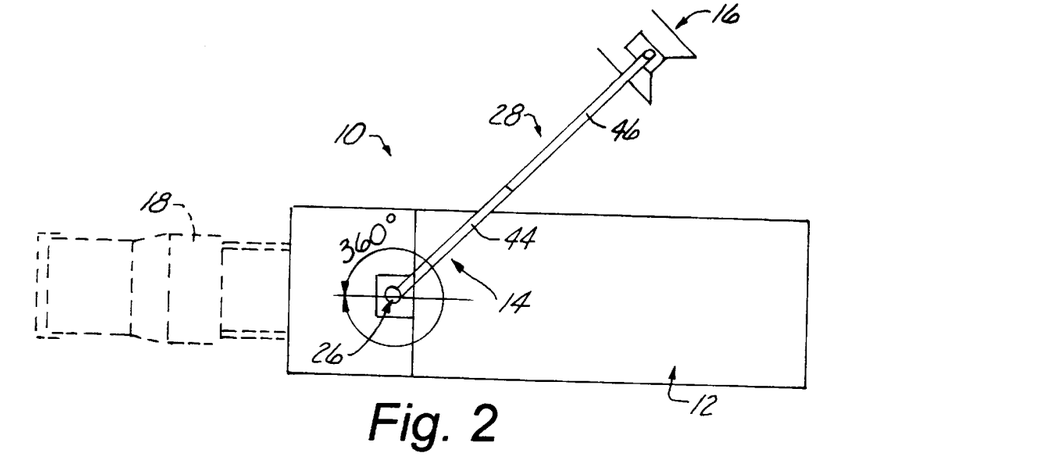
FIG. 2 is a plan view of the bale handling apparatus of the present invention showing the articulating arm being rotatable 360 degrees about a vertical axis.
Figure 3:
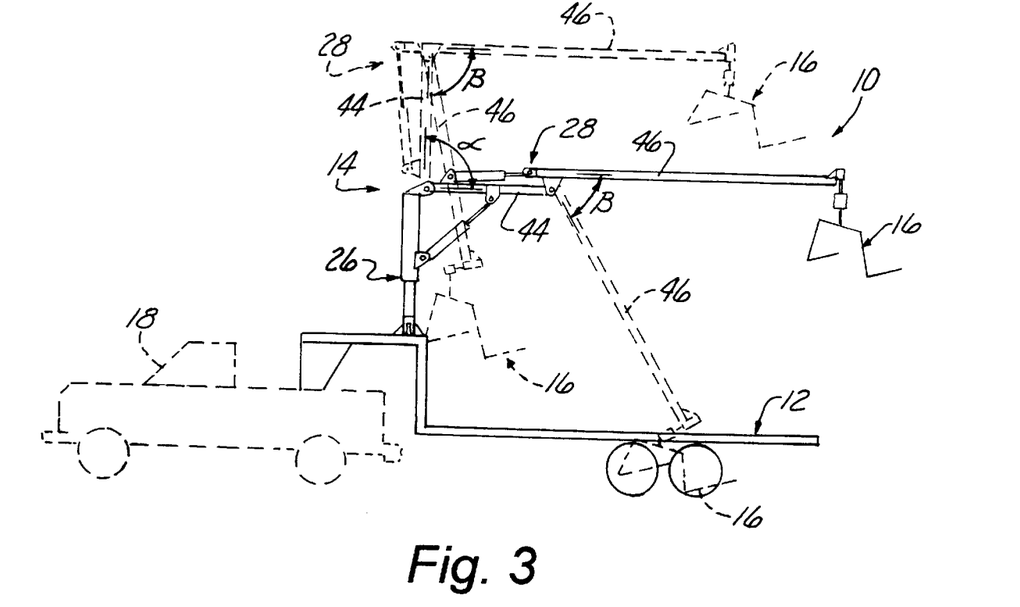
FIG. 3 is a side elevation view of the bale handling apparatus of the present invention showing the raising and lowering and extending and retracting range of motion of the boom portion of the articulating arm.

The large bale handling apparatus (10) is comprised of a wheeled trailer (12) and a rotatable articulating arm (14) and a bale lifting mechanism (16). The preferred trailer (12) is a flat bed goose neck trailer for towing behind a pickup truck (18) (FIGS. 2, 3). However, the trailer (12) may be any other type of trailer with an appropriate hitch or draw bar adapted for use with the vehicle by which it will be towed. Additionally, although a trailer (12) typically is considered to be a vehicle towed by another vehicle, the term trailer, as used in this specification, is meant to include any type of bed or deck used for transporting objects whether the trailer is to be towed behind another vehicle, such as a semi-trailer, or whether the trailer is part of the vehicle itself, such as a flat bed truck. The trailer (12) is preferably of a dimension to stack large hay bales (20), whether they be round or rectangular, two bales wide and four bales long as shown in FIG. 1.

The rotatable articulating arm (14), includes a first end (22) rigidly mountable to the trailer (12) and a second end (24) which rotatably and pivotally supports the bale lifting mechanism (16). Comprising the articulating arm (14) is a substantially vertical mast portion (26) and a boom (28). The vertical mast portion (26) preferably extends at least 10.5 feet above the bed of the trailer (12) so that the large bales (20) may be stacked two bales high as shown in FIG. 1 (large round bales are typically five feet in diameter and large rectangular bales are also typically five feet high). The substantially vertical mast portion (26) further includes a rotatable sleeve (30) partially disposed over a stationary post (32). The sleeve (30) is rotatable around the post (32), nearly 360 degrees, thereby allowing the articulating arm (14) to sweep a 360 degree arc around the trailer (12) as shown in FIG. 2. The means for rotating the sleeve (30) is discussed in further detail later.

The boom (28) is pivotally attached at one end (34) to the top of the sleeve (30) by brackets (36) and a pin (38) thereby forming a first joint (40). The other end (42) of the boom (28) rotatably and pivotally supports the bale lifting mechanism (16). The boom (28) is comprised of first and second elongated beams (44, 46) pivotally attached with brackets (48) and a pin (50) thereby forming a second joint (52) approximately at the middle of the boom (28). A first hydraulic cylinder (54) is pivotally attached to the rotatable sleeve (30) by brackets (56) and is pivotally attached at its other end to the first elongated beam (44) by brackets (58). A second hydraulic cylinder (60) is pivotally attached to the first elongated beam (44) by brackets (62) and is pivotally attached to the end of the second elongated beam (46) by brackets (64). The first joint (40) enables the entire boom (28) to raise and lower over approximately a 90 degree vertical arc ($\alpha$), as shown by dashed lines in FIG. 3, by actuation of the first hydraulic cylinder (54), while the second joint (52) allows the second elongated beam (46) to pivot downwardly from the first elongated beam (44) also over approximately a 90 degree vertical arc ($\beta$), also shown by hidden lines in FIG. 3, by actuation of the second hydraulic cylinder (60). Thus, the articulating arm (14) being rotatable 360 degrees about a vertical axis (FIG. 2) due to rotatable sleeve (30), in conjunction with the first and second joints (40, 52), which enables the arm (14) to extend and retract or move vertically, allows the arm (14) to pick up bales (20) within its reach anywhere around the trailer (12), and to stack the bales (20) on the trailer (12) as shown in FIG. 1.

Figure 4:
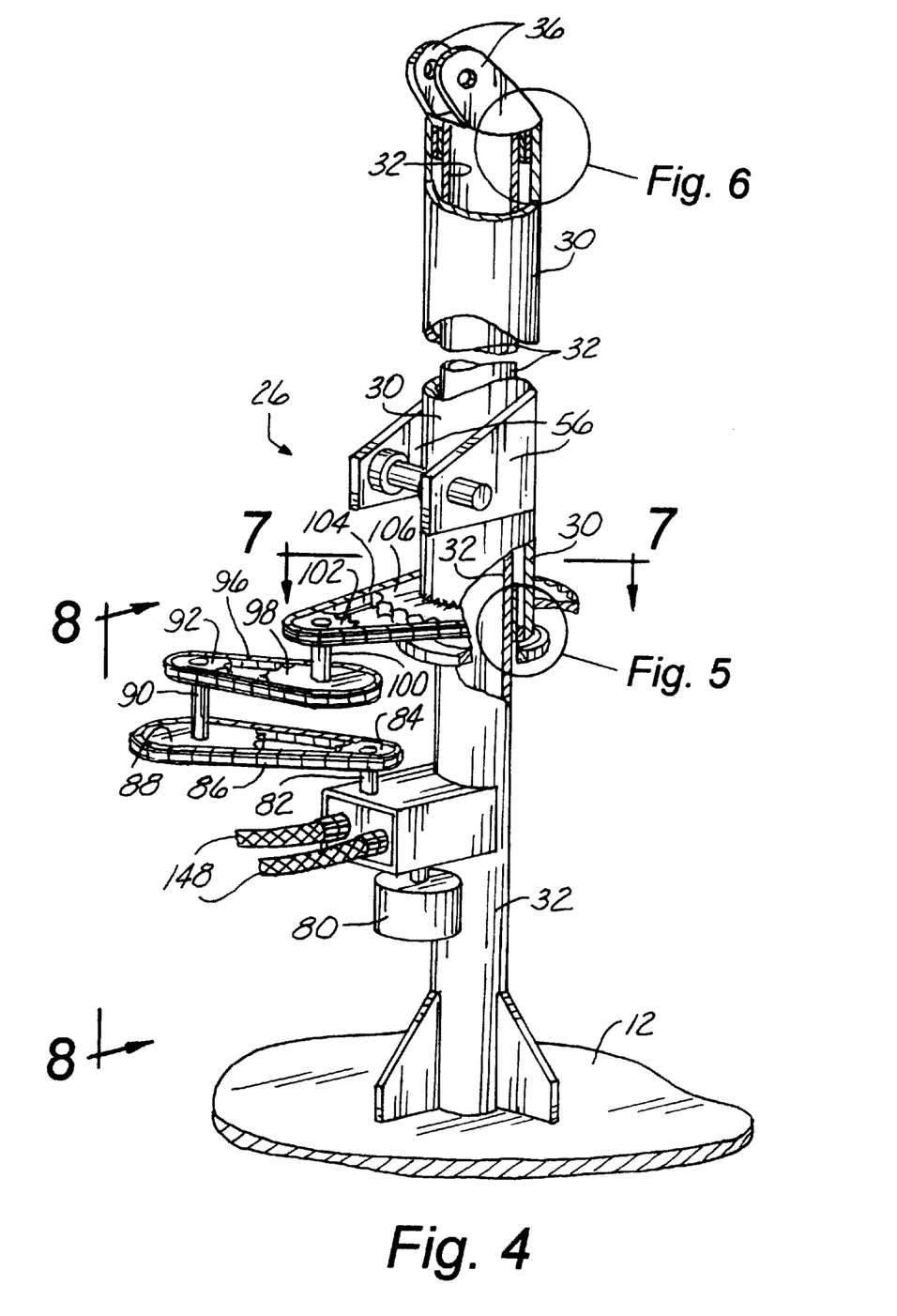
FIG. 4 is a partial sectional, perspective view of the substantially vertical mast portion of the rotatable articulating arm.
Figure 5:
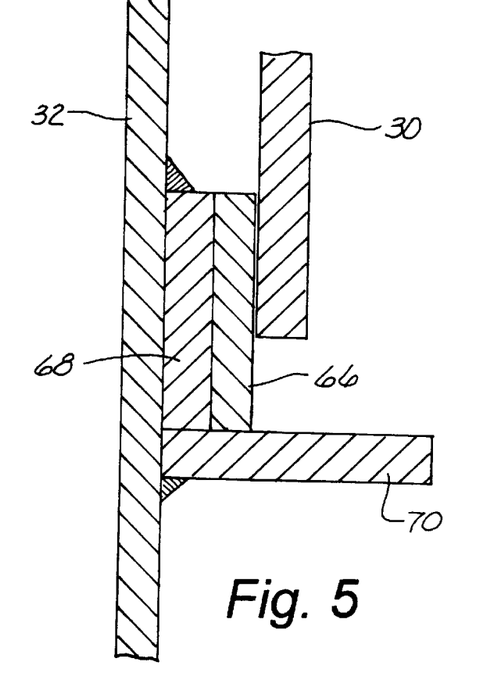
FIG. 5 is a detailed cross sectional view of the bottom connection of the rotatable sleeve with the stationary post from FIG. 4.
Figure 6:
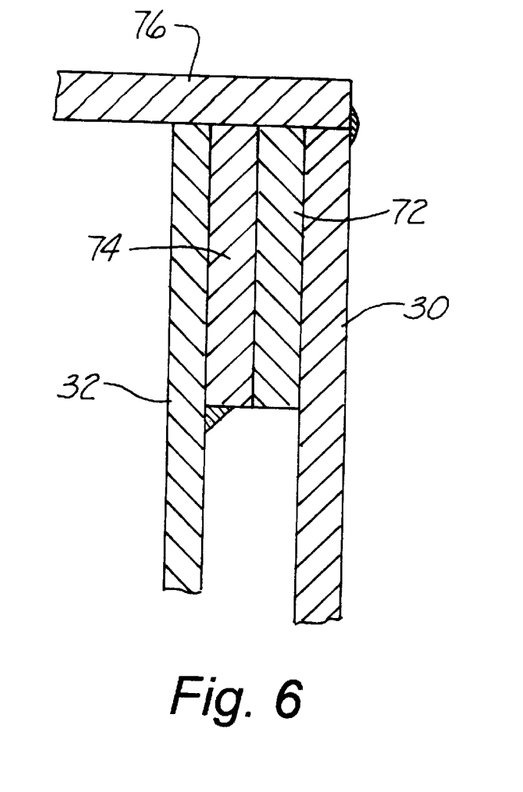
FIG. 6 is a detailed cross sectional view of the top connection of the rotatable sleeve with the stationary post from FIG. 4.

Referring now to FIG. 4, which is a partial sectional, perspective view of the substantially vertical mast portion (26) of the rotatable articulating arm (14), in conjunction with FIGS. 5 and 6 which are detailed cross-sectional views from FIG. 4, it can be seen that the stationary post (32) extends through and to the top of the sleeve (30) (FIGS. 4, 6). At the bottom of the sleeve (30) is a first brass bushing (66) (FIGS. 4, 5) which is pressed into the bottom of the pipe sleeve (30). A second brass bushing (68) having a machined annular flange (70) is welded to the stationary post (32). The sleeve (30) with the first bushing (66) pressed into the end thereof, sets down on the annular flange (70) in a bearing relationship. The load, due to the weight of the sleeve (30), the boom (28), and the bale lifting mechanism (16) including the weight of any bales (20) being lifted thereby, is thus transferred to the post (32) through the bearing connection of the first bushing (66) on the annular flange (70) of the second bushing (68). At the top of the sleeve (30) is a third brass bushing (72) (FIG. 6) pressed into the top of the pipe sleeve (30). A fourth bushing (74) is welded to the stationary inner post (32). These machined brass bushings (66, 68, 72 and 74) allow the sleeve (30) to easily rotate about the post (32) with minimal friction and also keep the sleeve (30) from wobbling on the post (32) as it rotates and as the boom (28) is raised and lowered. A cap (76) (FIG. 6) is seal welded to the top of the pipe sleeve (30) to seal off the opening at the top of the mast (26) and to provide a base onto which to attach the brackets (36) for connecting the boom (28).

Figure 7:
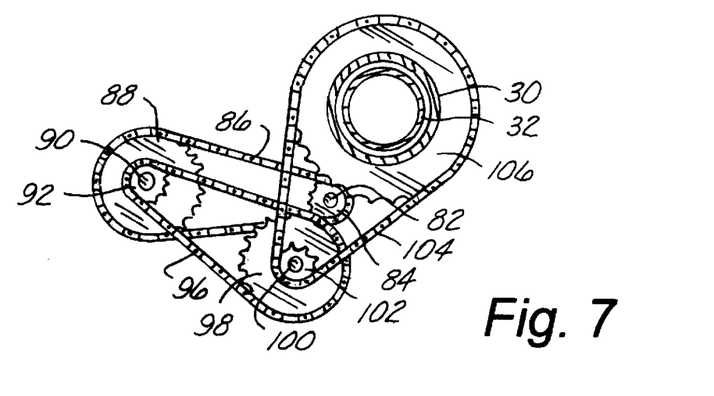
FIG. 7 is a plan view taken along line 7—7 of FIG. 4 showing the preferred means for rotating the mast portion of the rotatable articulating arm.
Figure 8:
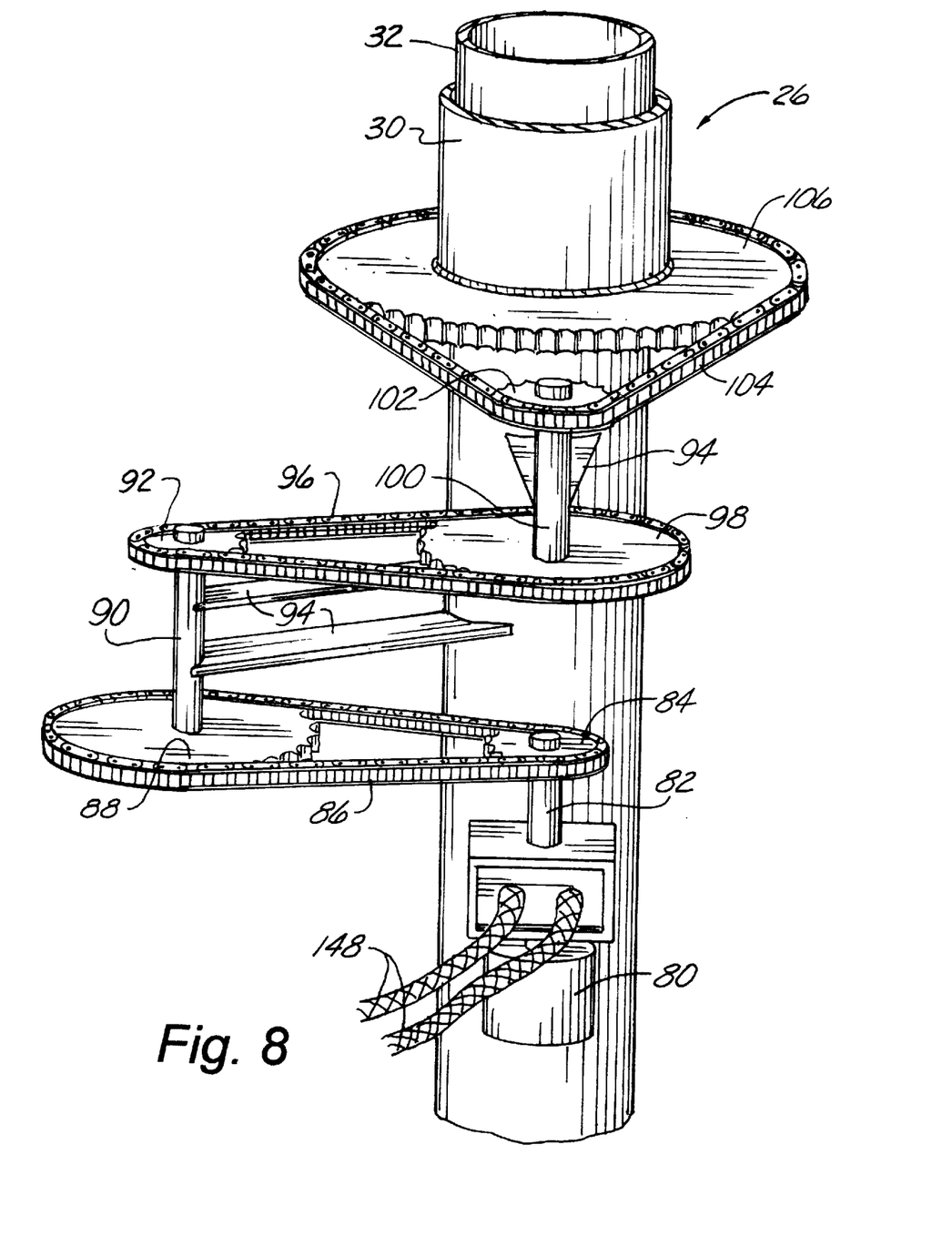
FIG. 8 is a partial perspective view of the preferred means for rotating the mast portion of the rotatable articulating arm as viewed along line 8—8 of FIG. 4.

Referring now to FIGS. 4, 7 and 8, which are various views of the preferred means for rotating the sleeve (30) about the post (32), it can be seen that a hydraulic motor (80) is employed with a series of varying sizes of sprockets and chains to rotate the sleeve (30) about the post (32). The series of varying sizes of sprockets are necessary to reduce the rotation of the hydraulic motor shaft (82) (FIG. 4, 8) from the hydraulic motor (80) to a preferred 45 to 1 reduction ratio. Obviously, the size and number of the sprockets will vary depending on the reduction ratio desired.

Attached to the hydraulic motor shaft (82) is preferably a first 9-tooth sprocket (84) which is connected by a first chain (86) to a first 27-tooth sprocket (88). A first mandrel (90) connects the first 27-tooth sprocket (88) to a second 9-tooth sprocket (92). Brackets (94) rigidly support the first mandrel (90) a distance outward so the sprockets (88, 92) clear the mast (26). A second chain (96) connects the second 9-tooth sprocket (92) to a second 27-tooth sprocket (98) thereby creating a 5 to 1 reduction ratio. A second mandrel (100) connects the second 27-tooth sprocket (98) to a third 9-tooth sprocket (102). Brackets (94) rigidly support the second mandrel (100) a distance outward so the sprockets (98, 102) clear the mast (26). A third chain (104) connects the third 9-tooth sprocket (102) to a 45-tooth sprocket (106) which is rigidly fixed by a welded connection to the rotatable sleeve (30) of the mast (26) thereby creating the preferred 45 to 1 reduction ratio. A plan view of the preferred means for rotating the shaft (30) is illustrated in FIG. 7 for further clarity. As indicated previously, the particular number and size sprockets used may vary depending on the reduction ratio desired. Additionally, alternative means may be used for rotating the mast portion (26) of the articulating arm (14). For example, interlocking gears or cables may be used to rotate the mast, and instead of using hydraulic motors, electric motors may be used. Accordingly, such alternative structures used for rotating the mast (26) are to be considered equivalent structures of the preferred structure discussed above and therefore, within the scope of the claimed invention.

Figure 9:
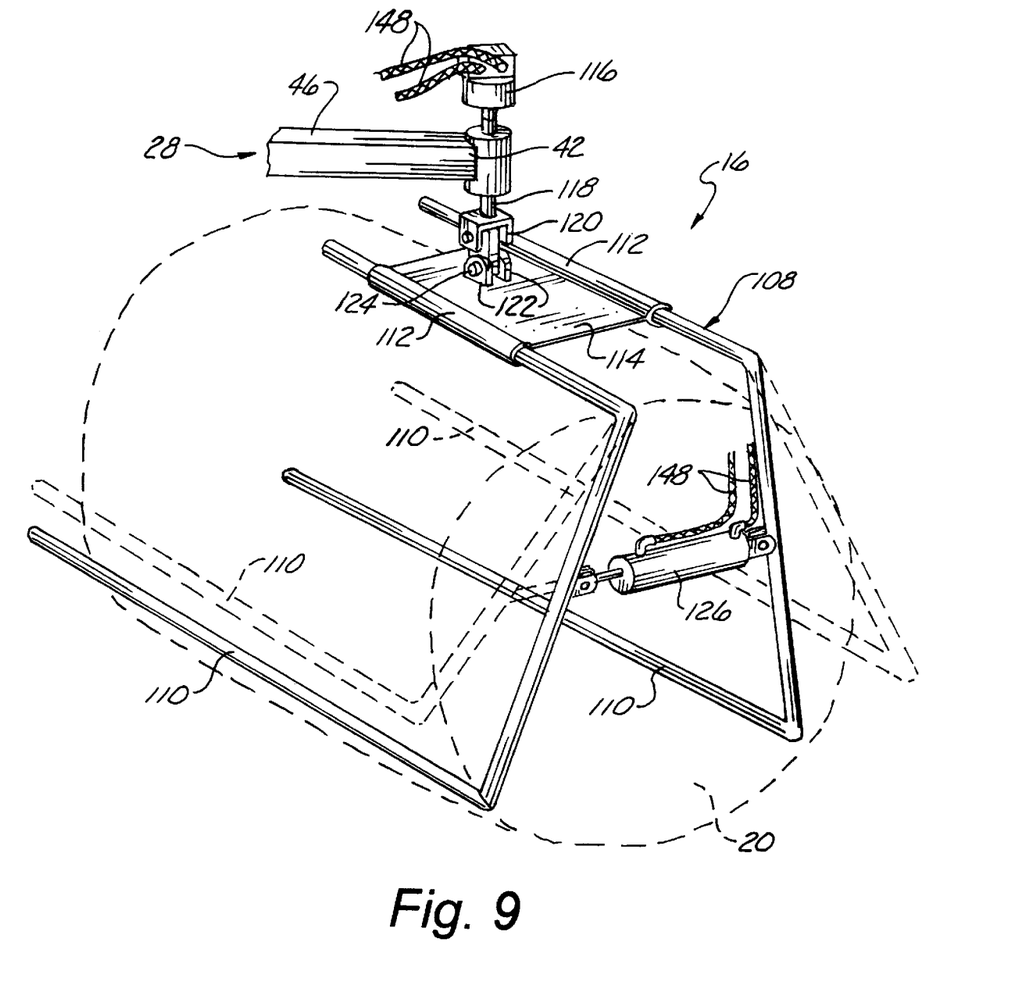
FIG. 9 is a detailed perspective view of the bale lifting mechanism comprising the lifting fork.

The bale lifting mechanism (16) is pivotally and rotatably attached to the end (42) (FIG. 1, 9) of the second elongated beam (46) of the boom (28). The bale lifting mechanism (16) may be a lifting fork attachment (108) (FIG. 9) for lifting large round bales (20) or alternatively, the bale lifting mechanism (16) may be a rectangular bale attachment (130) (FIG. 10) for lifting large rectangular bales (20).

The lifting fork attachment (108) (FIG. 9) comprises a pair of lifting forks (110) which are free to rotate within sleeves (112). A plate (114) connects the sleeves (112). Attached to the beam (46) is a hydraulic motor (116) which rotates a shaft (118) when actuated. Attached to the end of the shaft (118) is a universal joint (120). Fixed to the top of the plate (114) are brackets (122) which receive a pin (124) thereby pivotally connecting the lifting fork attachment (108) to the universal joint (120). Pivotally attached to the lifting forks (110) is a hydraulic cylinder (126). The hydraulic cylinder (126) enables the forks (110) to open (see hidden lines in FIG. 9) in order to drop down over a bale (20). The forks (110) are then closed to lift the bale (20). The lifting forks (110) are preferably 5.5 feet in length and 5 feet tall to enable a typical 5 foot diameter large round bale (20) to be lifted.

Figure 10:
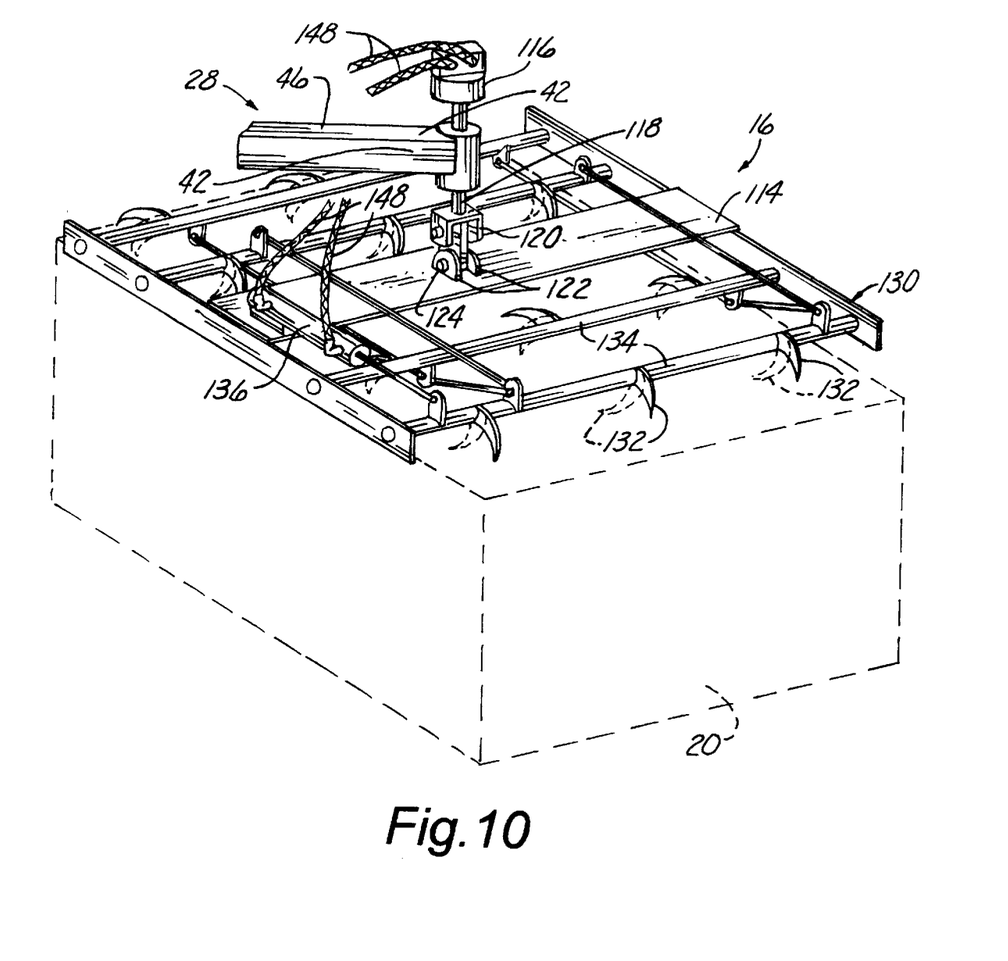
FIG. 10 is a detailed perspective view of the bale lifting mechanism comprising the alternative rectangular bale attachment.

The rectangular bale attachment (130) is well known in the farming industry and therefore FIG. 10 is included for illustrative purposes only. A typical rectangular bale attachment (130) includes a series of tines (132) which are attached to rotatable shafts (134). Actuation of a hydraulic cylinder (136) causes the tines (132) to rotate and spear the bale (20) (as shown in hidden lines in FIG. 10), thereby securely holding the bale (20) so it may be lifted. The bale (20) is released by reactuating the hydraulic cylinder (136) to rotate the tines (132) out of the bale (20). Similar to the lifting fork attachment (108), the rectangular bale attachment (130) includes a plate (114) to which is fixed brackets (122) for receiving a pin (124) for pivotally connecting the rectangular bale attachment (130) to the universal joint (120) at the end of the boom (28).

As indicated, the articulating arm (14) and the bale lifting mechanism (16) are preferably hydraulically actuated. Accordingly, also preferably mounted on the trailer (12) is a gas engine (140) (FIG. 1) which powers a hydraulic pump (142) fluidly connected to a hydraulic oil tank (144). A series of valves controlled by levers (146) regulates the hydraulic fluid flowing via hoses (148) between the hydraulic pump (142) and the hydraulic cylinders (54, 60, 126) (FIG. 1) and hydraulic motors (80, 116) (FIG. 8, 9, 10). Those skilled in the art are familiar with the connection and operation of such hydraulic equipment.

Therefore, although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A large bale handling apparatus, comprising:
   (a) a wheeled trailer having a longitudinal centerline;
   (b) a rotatable articulating arm mounted on said wheeled trailer, said rotatable articulating arm, comprising:
      (i) a rotatable substantially vertical mast portion comprising a stationary post fixed to said wheeled trailer and a sleeve disposed over at least a portion of said stationary post, said sleeve being rotatable about said stationary post;
      (ii) a boom portion having a first end and a second end, said first end of said boom portion pivotally attached to said rotatable sleeve, wherein rotation of said rotatable sleeve rotates said boom portion about said stationary post such that said boom portion will sweep a horizontal arc at least 90 degrees from said longitudinal centerline fore and aft on each side of said wheeled trailer, said boom portion further comprising:

(A) first and second elongated beams, said first elongated beam pivotally attached at a first end to said rotatable sleeve, a second end of said first elongated beam pivotally attached near a first end of said second elongated beam;

(B) a first hydraulic cylinder pivotally attached at one end to said rotatable sleeve and pivotally attached at another end to said first elongated beam;

(C) a second hydraulic cylinder pivotally attached at one end to said first elongated beam and pivotally attached at another end to said second elongated beam;

(c) a bale lifting mechanism rotatably and pivotally attached at a second end of said second elongated beam of said boom portion of said rotatable articulating arm; and (d) a drive assembly to rotate said rotatable sleeve with respect to said stationary post, comprising: a motor having a rotatable shaft and a plurality of sprockets interconnected by chains and mandrels, such that rotation of said rotatable shaft of said motor causes rotation of said interconnected sprockets to thereby rotate said rotatable sleeve about said stationary post.

2. The large bale handling apparatus of claim 1 wherein said bale lifting mechanism comprises a lifting fork attachment.

3. The large bale handling apparatus of claim 2 wherein said lifting fork attachment includes lifting forks moveable between first and second positions.

4. The large bale handling apparatus of claim 1 wherein said bale lifting mechanism comprises a rectangular bale attachment.

5. The large bale handling apparatus of claim 4 wherein said rectangular bale attachment includes a plurality of tines movable between first and second positions.

6. The large bale handling apparatus of claim 1 wherein said motor is a hydraulic motor.

7. The large bale handling apparatus of claim 1 wherein said motor is an electric motor.

8. A large bale handling apparatus, comprising:

(a) a wheeled trailer having a longitudinal centerline;

(b) a rotatable articulating arm mounted on said wheeled trailer, said rotatable articulating arm, comprising:

(i) a rotatable substantially vertical mast portion comprising a stationary post fixed to said wheeled trailer and a sleeve disposed over at least a portion of said stationary post, said sleeve being rotatable about said stationary post;

(ii) a boom portion having a first end and a second end, said first end of said boom portion pivotally attached to said rotatable sleeve, wherein rotation of said rotatable sleeve rotates said boom portion about said stationary post such that said boom portion will sweep a horizontal arc at least 90 degrees from said longitudinal centerline fore and aft on each side of said wheeled trailer, said boom portion further comprising:

(A) first and second elongated beams, said first elongated beam pivotally attached at a first end to said rotatable sleeve, a second end of said first elongated beam pivotally attached near a first end of said second elongated beam;

(B) a first hydraulic cylinder pivotally attached at one end to said rotatable sleeve and pivotally attached at another end to said first elongated beam;

(C) a second hydraulic cylinder pivotally attached at one end to said first elongated beam and pivotally attached at another end to said second elongated beam;

(c) a bale lifting mechanism rotatably and pivotally attached at a second end of said second elongated beam of said boom portion of said rotatable articulating arm; and (d) a drive assembly to rotate said rotatable sleeve with respect to said stationary post, comprising: a motor having a rotatable shaft and flexible power transfer means operably connected to said rotatable shaft and operably to said rotatable sleeve, such that rotation of said rotatable shaft of said motor is transferred by said flexible power transfer means to effectuate rotation of said rotatable sleeve about said stationary post.

9. The large bale handling apparatus of claim 8 wherein said motor is a hydraulic motor.

10. The large bale handling apparatus of claim 8 wherein said motor is an electric motor.

11. The large bale handling apparatus of claim 8 wherein said bale lifting mechanism comprises a lifting fork attachment.

12. The large bale handling apparatus of claim 8 wherein said bale lifting mechanism comprises a rectangular bale attachment.

* * * * *